United States Patent
Kostyukov et al.

(10) Patent No.: US 10,749,856 B2
(45) Date of Patent: Aug. 18, 2020

(54) SYSTEM AND METHOD FOR MULTI-TENANT SSO WITH DYNAMIC ATTRIBUTE RETRIEVAL

(71) Applicant: Ingram Micro, Inc., Irvine, CA (US)

(72) Inventors: Andrey Kostyukov, Dolgoprudny (RU); Maxim Kuzkin, Irvine, CA (US)

(73) Assignee: INGRAM MICRO, INC., Plainfield, IN (US)

( * ) Notice: Subject to any disclaimer, the term of this patent is extended or adjusted under 35 U.S.C. 154(b) by 128 days.

(21) Appl. No.: 15/821,375

(22) Filed: Nov. 22, 2017

(65) Prior Publication Data

US 2018/0167378 A1 Jun. 14, 2018

Related U.S. Application Data

(60) Provisional application No. 62/425,646, filed on Nov. 23, 2016.

(51) Int. Cl.

| G06F 21/00 | (2013.01) |
|---|---|
| H04L 29/06 | (2006.01) |
| G06F 9/54 | (2006.01) |
| G06F 9/445 | (2018.01) |
| H04L 9/32 | (2006.01) |

(52) U.S. Cl.
CPC ...... *H04L 63/0815* (2013.01); *G06F 9/44526* (2013.01); *G06F 9/547* (2013.01); *H04L 9/3263* (2013.01)

(58) Field of Classification Search
None
See application file for complete search history.

(56) References Cited

U.S. PATENT DOCUMENTS

| 7,657,639 | B2 * | 2/2010 | Hinton | H04L 63/0815 |
| | | | | 709/227 |
| 8,424,058 | B2 * | 4/2013 | Vinogradov | G06F 21/629 |
| | | | | 705/50 |
| 8,949,939 | B2 * | 2/2015 | Peddada | G06F 21/629 |
| | | | | 709/229 |
| 9,369,456 | B2 * | 6/2016 | Singh | H04L 63/0815 |
| 2010/0100924 | A1 * | 4/2010 | Hinton | G06F 21/10 |
| | | | | 726/1 |
| 2011/0277027 | A1 * | 11/2011 | Hayton | H04L 63/0815 |
| | | | | 726/8 |
| 2012/0096521 | A1 * | 4/2012 | Peddada | G06F 21/629 |
| | | | | 726/4 |

(Continued)

*Primary Examiner* — Maung T Lwin
(74) *Attorney, Agent, or Firm* — Ice Miller LLP

(57) ABSTRACT

A system and method for multi-tenant single sign-on (SSO) identity management with dynamic attribute retrieval, the system includes at least one service provider, at least one service provider plug-in, and a service automation platform. A method for multi-tenant SSO identity management with dynamic attribute retrieval, includes the steps of receiving a link to a service provider at an SSO dispatcher, the SSO dispatcher identifying a service, requesting at the SSO dispatcher, user attributes for the at least one service provider, assembling at a service provider handler implementation, a response query, retrieving identity provider credentials from the service automation platform, signing at the SSO dispatcher, a package for a user's authentication, and redirecting the package to the service provider.

6 Claims, 6 Drawing Sheets

(56) References Cited

U.S. PATENT DOCUMENTS

| | | | |
|---|---|---|---|
| 2012/0185913 A1* | 7/2012 | Martinez | G06F 9/455 726/1 |
| 2014/0090037 A1* | 3/2014 | Singh | H04L 63/0815 726/7 |
| 2015/0222638 A1* | 8/2015 | Morley | G06F 21/105 726/28 |
| 2016/0134619 A1* | 5/2016 | Mikheev | H04L 63/0815 726/8 |
| 2016/0314299 A1* | 10/2016 | Almer | G06F 21/6218 |

* cited by examiner

SYSTEM AND METHOD FOR MULTI-TENANT SSO WITH DYNAMIC ATTRIBUTE RETRIEVAL

CROSS REFERENCE TO RELATED APPLICATION

The present application is a nonprovisional patent application, which claims the priority benefit of U.S. Application Ser. No. 62/425,646, filed Nov. 23, 2016, the text and drawings of which are hereby incorporated in its entirety.

TECHNICAL FIELD

This disclosure relates to a system and method for a multi-tenant service automation system, and more particularly, to a multi-tenant single sign-on (SSO) system

BACKGROUND

A service automation platform Provider is an organization that sells subscriptions to a variety of software services (the "Software Services") to its customers. Commonly, these customers are small or medium-sized organizations as well as individuals. The service automation platform Provider may have its own computing capabilities. The service automation platform Provider can also sell subscription for Software Services involving a computer data center which is located in its own facilities, as well as cloud based software-as-a-service (SaaS) involving computer data centers located at facilities of developers of the services or other remote locations.

The service providers are various software companies. Their function is to develop, support, execute, and sell services (or subscriptions to services). For example, vendors of SaaS, like dropbox.com, office365.com, to name a few non-liming examples, may be considered as service providers. For each service, the service providers provides an application programming interface (API), comprised of a set of predefined classes, procedures, functions, structures, and constants for the use of external software products.

When a service automation platform Provider desires to offer to its customers integrated Software Services of a plurality of service providers, the service automation platform Provider develops a service delivery platform that integrates the desired Software Services. In at least one embodiment of the present disclosure, the API is used to integrate the service providers's services with the service automation platform provided by the service automation platform Provider.

When integrating various Software Services, it is desirable to ensure that authentication and access controls are in place for users of the integrated Software Services. In at least one embodiment of the present disclosure, a single sign-on (SSO) technology is used. With SSO, a user presents authentication credentials to a service once using one set of login credentials (e.g., name and password, to name just one non-limiting example), and is subsequently allowed to access Software Services.

Referring now to FIG. 1, there is shown a conventional system for integration and management of SSO, generally indicated at 100. The system 100 comprises a first service provider 110, a second service provider 111, a service provider SSO API 115, a service provider provisional API 117, a tenant 120, a service automation platform 130 and a user interface 140 therein, a shared identity provider (IDP) 150, a shared IDP user storage 160, a shared IDP credentials storage 170, a user 180, a service provider plug-in 175, a service provider plug-in user interface 185, a service provider service provisioning module 190, and a service provider user data storage 195. It will be appreciated that the conventional system for integration and management of SSO may include a plurality of service provider plug-ins (e.g. a second service provider plug-in 176).

Tenant 120 may represent a client of the service automation platform 130. Tenant 120 can be purchases of services from the service automation platform 130. Tenant 120 may subscribe to at least one of a plurality of SSO-based software services offered by service providers 110 and 111. For example, tenant 120 may use the user interface 140 (e.g., a graphical user interface) of the service automation platform 130. The user interface 140 operates to request a service provider that corresponds to the each of the service providers 110 and 111. For example, the user interface 140 may operate to request service provider plug-in 175 for provisioning of a subscription to the service provider 110. The service automation platform 130 is operably connected with the service provider plug-in 175, via the service automation platform 130, for technical integration of the software service offered by the service provider 110. It will be appreciated that a particular plug-in is usually provided for a particular service, e.g. plug-in 175 is designed for the service provider 110 and plug-in 176 is respectively designed for the service provider 111. It will be further appreciated that a group of service providers may use the same service provider plug-in.

The system 100 requests federation service provisioning using the service provider provisional API 117, that is defined by the service provider 110. When a user 180 desires to access a plurality of service from the each of the service provider 110 and 111, the user 180 is granted the ability to use the same set of credentials across the plurality of services from the each of the service provider 110 and 111. In the conventional system for integration and management of SSO, authentication may take place in one single domain (i.e. for example, with a single service provider 110), and other security realms that trust this primary domain can reuse the authentication and trust the authenticity of the identity established. This results in what is called a federation. Federation provisioning comprises provisioning of a user attribute schema (not shown) and user Attributes (not shown) which are stored in shared IDP user storage 160, and service provider plug-in user storage 195. The user attribute schema comprises rules of attribute packaging. The user attribute schema may be different for each of the plurality of service providers 110 and 111. The tenant 120 further uses the user attribute schema to transmit data concerning its users, as well as data which are expected to be generated in the process of provisioning. This data may include various types of user attributes, such as, for example, a username, email address, address, subscription id, tenant id, and zipcode. The user attributes may further comprise such data such as, for example, username, mail, address and zip-code, which may be entered by the tenant 120. It will be further appreciated that the user attributes may also include, such as, for example, subscription id, and tenant id, which may be generated in the process of provisioning a user 180 with access to service provider 110 and 111. After any change in the user attributes the service provisioning module 190 updates the user data storage 160, and service provider plug-in user storage 195, and synchronizes them. It will be appreciated that the second service provider plug-in 176 may be used to create a subscription to the second service provider 1

In at least one embodiment of the conventional art, in order to access the service provider 110 (or 111), a user 180 opens a link, such as, for example, a URL, to the plurality of software services provided by the service provider 110 (or 111) in the process of provisioning. The link directs user 180 to shared IDP 150. The user 180 presents his/her user credentials, such as for example, a user name and password combination, to the shared IDP 150. The shared IDP 150 retrieves user attributes and packages it into an attribute statement according to a provisioned attribute schema and redirects the user 180 to the service provider 110 via the service provider SSO API 115, using a signed authentication token. The shared IDP 150 forms the SSO token using the user attributes and the user attribute schema from shared IDP user storage 160, and using credentials 170, which are trusted by the service provider 110. The shared IDP 150 then redirects the user 180 by a standard SSO request with an embedded SSO token. Thus, the user 180 is granted access to the service provider 110 without entering any further credentials.

A conventional identity provider used by service automation platform 130 has mainly two variants of SSO deployments or their combination: 1) a Shared Identity Provider model wherein a single dedicated identity provider server with all service providers' (e.g. service provider 110 and 11)1) data provided from all tenants 120, where all tenants 120 reuse the contract between the service provider 110 (or 111) and the service automation platform 130; and 2) a Private Identity Provider model wherein there is an auto-allocated identity provider per tenant account or per subscription, where all tenants 120 have a separate contract between the service provider 110 (or 111) and the tenant 120, and the service automation platform 130 is a third party. The Private Identity Provider model makes the same list of actions and connections with the each of the service provider plug-ins 175 and 176, the service automation platform 130 and with service providers 110 and 111 as in the Shared Identity Provider model.

The conventional embodiment has a number of shortcomings. First, there are contract issues that need to be addressed. In the scenario with shared identity provider 150, a service provider 110 (or 111) should trust a single identity provider of the service automation platform 130. However, sometimes the service provider 110 cannot trust certain installations, such as, for example, when the service automation platform 130 is new and not well established as being credible. Furthermore, the service automation platform 130 comprises a third party relationship between a tenant 120 and the service provider 110 (or 111), and, if the service provider 110 trusts any tenant 120 of the service automation platform 130, it has to trust all tenants of this service automation platform 130. A private identity provider may be used, but it forces tenants to configure their own identity provider and to make separate contracts with the service provider 110 (or 111).

A second issue arises when a shared identity provider 150 or private identity provider keeps user attribute. The user attributes are stored in service provider plug-in's user storage 195 and can be changed by a service provider 110. The user attributes are responsible for compatibility between the tenant 120 and the service provider 110 (or 111). This means that the user attributes must be synchronized every time between service provider 110, service provider plug-in 175 and shared IDP 150. If an issue arises, the service automation platform 130 is focal point as all interactions go through the service automation platform 130. This issue is more problematic in the Shared Identity Provider model because this model may include a more complex configuration for all of the service providers operating at the same time.

A third issue is technical costs with syncing; as the user attributes can be changed, and the user attribute schema can be changed on the service provider 110, and the service provider plug-in 175 is responsible for syncing these values to the corresponding identity provider (e.g. Shared Identity Provider 150). This may be problematic because syncing of the entire set of the user attributes and user attribute schema can lead to longer sync times and additional storage with duplicated data.

A fourth issue is the technical difficulties arising around the complexity of the API. A complex API is required for provisioning the Identity Provider, which supports the syncing feature. Also, this API must have security requirements to prevent malicious User Attribute changes and theft of authentication data.

Lastly, several identity providers are managed within the subscriptions. Some services require several identity providers in a single subscription. For example, MICROSOFT® Corporation requires a separate identity provider for every active directory domain. Therefore, it is impossible to consider all possible configurations of the identity providers for all of the service providers 110 and 111.

Accordingly, it is desired to have an improved multi-tenant SSO system, which overcomes the shortcomings of the conventional SSO system, by having a capacity for plug-ins to create a number of the virtual identity providers.

SUMMARY

The present disclosure relates to a system and method for multi-tenant single sign-on (SSO) identity management with dynamic attribute retrieval. In at least one embodiment of the present disclosure, the system includes at least one service provider comprising a service provider SSO module, the at least one service provider configured to provide at least one software service; at least one service provider plug-in corresponding to the at least one service provider, the at least one service provider plug-in operably connected to the at least one service provider via the service provider SSO module; and a service automation platform communicatively coupled to the service provider plug-in and the service provider, the service automation platform further comprising a single sign-on (SSO) dispatcher.

In at least one embodiment of the present disclosure, the method for multi-tenant SSO identity management with dynamic attribute retrieval includes the steps: activating a link to a service provided by the at least one service provider; receiving at an SSO dispatcher, the link, the SSO dispatcher identifying the service provided by the at least one service provider; requesting at the SSO dispatcher, user attributes for the at least one service provider from a service provider handler; assembling at a service provider handler implementation, a response query with the user attributes, the user attributes assembled according to a user attributes schema and service provider settings; checking at the SSO dispatcher, whether the response query is a success, and if successful, proceeding to the next step, and if unsuccessful, displaying a message; checking at the SSO dispatcher, whether the response query includes identification of an identity provider, and if the response query does not include identification of an identity provider, retrieving public identity provider credentials from the service automation platform, and if the response query is successful, proceeding to the next step; determining at the SSO dispatcher, whether the response query identifies a managed identity provider, or an exclusive identity provider, and requesting the respective identity provider's credentials identified herein; signing at the SSO dispatcher, a package for a user's authentication with the credentials; and redirecting at the SSO dispatcher, the package to the service provider.

DETAILED DESCRIPTION

Reference will now be made in detail to the preferred embodiments of the present disclosure, examples of which are illustrated in the accompanying drawings. Additional features and advantages of the disclosure will be set forth in the description that follows, and will be apparent from the description, or may be learned by practice of the disclosure. It is to be understood that both the foregoing general description and the following detailed description are exemplary and explanatory and are intended to provide further explanation of the disclosure as claimed.

Figure 1:
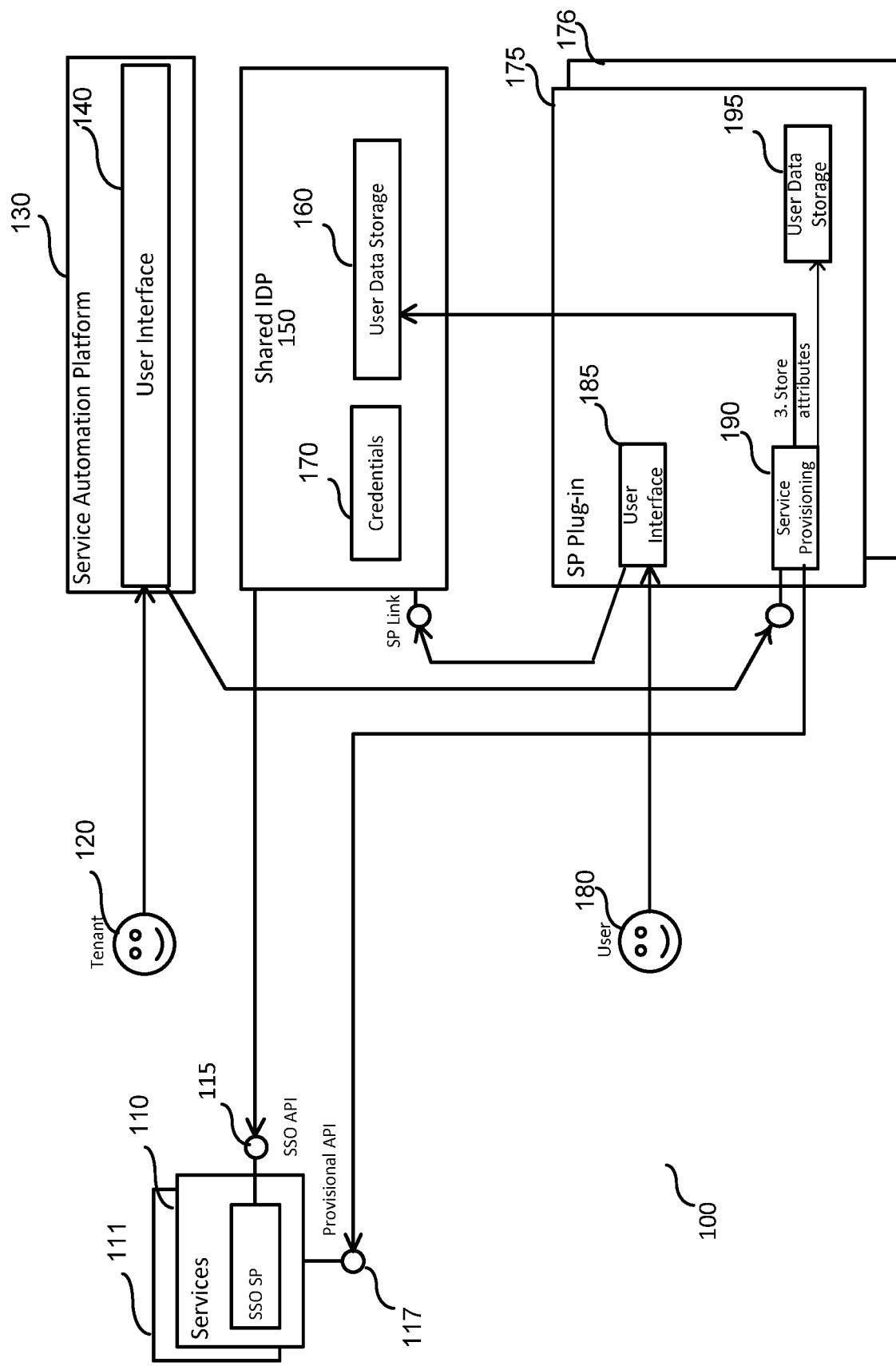
FIG. 1 is a schematic drawing of a system for multi-tenant SSO with dynamic attribute retrieval.
Figure 2:
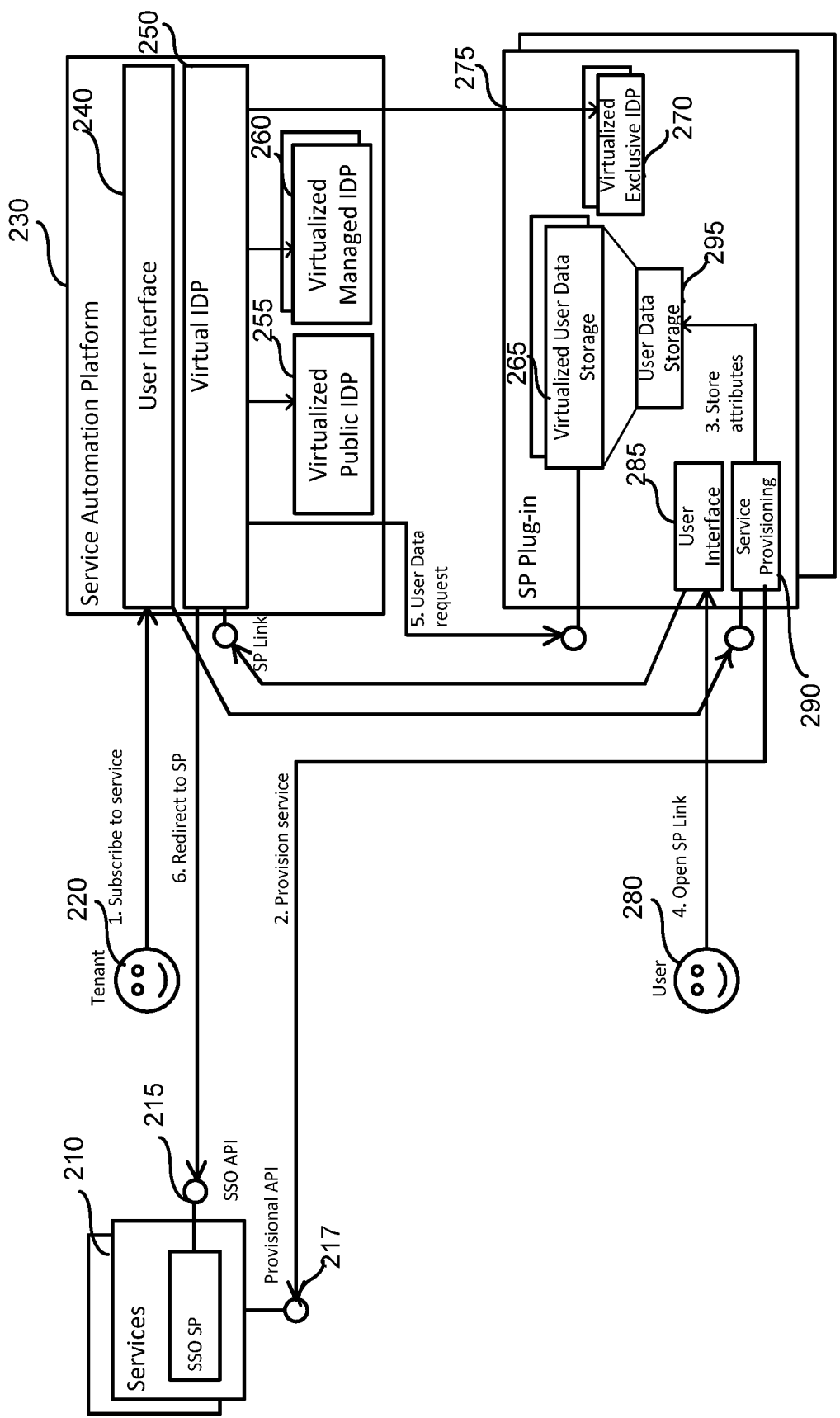
FIG. 2 is a schematic drawing of a system for multi-tenant SSO with dynamic attribute retrieval.

Referring now to FIG. 2, there is shown a schematic drawing of a system for multi-tenant SSO with dynamic attribute retrieval, indicated generally at 200. This description is presented in terms of programs, data structures or procedures executed on a computer or network of computers. The software programs implemented by the system may be written in any programming language—interpreted, compiled, or otherwise. These languages may include, but are not limited to, PHP, ASP.net, HTML, HTML5, Ruby, Perl, Java, Python, C++, C #, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, Node.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architectures through one or more application programming interfaces or otherwise.

The system 200 includes a service provider 210, a service provider SSO API 215, a service provider provisional API 217, a tenant 220, a service automation platform 230, a user interface 240, a virtual IDP 250, a virtualized public IDP 255, a virtualized managed IDP 260, a user 280, a service provider plug-in 275, a service provisioning module 290, a user data storage 295, and a virtualized user data storage 265. It will be appreciated that for simplicity, only one of each component of the system 200 is shown, but embodiments of the present disclosure may include a plurality of each of the components of the system 200.

In at least one embodiment of the present disclosure, the service automation platform 230 allows a user 280 to acquire subscription based access to various software services from at least one of a plurality of software service providers (e.g. service provider 210), and to automatically configure these services according to the user 280's execution environments and preferences.

In at least one embodiment of the present disclosure, the service provider plug-in 275 is a plug-in for technical integration of service provider 210 into the service automation platform 230. Service provider plug-in 275 may be located on a cloud, or located on premises, with service automation platform 230. The service provider 210 may need to apply user attributes and configuration settings required for their service to function on the end-user's (i.e., a customer's) site. The service provider 210 can integrate their services with the service automation platform 230 for establishing a stable channel for provisioning their products to the end-users (e.g. a tenant 220).

In at least one embodiment of the present disclosure, a plug-in is a set of commands that allows for receiving data and API calls from the service automation platform 230, and passes them to the service provider 210 for configuration and provisioning of the service. It will be appreciated that a particular plug-in may be provided for a particular service. It will be appreciated that a group of services by the same service provider 210 may use the same service provider plug-in 275. For example, in one embodiment of the present disclosure, the service provider plug-in 275 is associated with the service provider 210, and may be used for any plurality of services offered by the service provider 210. It will be further appreciated that each service provider plug-in 275 has a digital certificate signed by the service provider 210.

It will be appreciated that having a special service provider plug-in for each service provisioned by the service automation platform 230 is inefficient and costly. A cloud-based service provider plug-ins hub service may be implemented, wherein the plug-ins hub service includes a database or a list containing names of each of the plurality of service providers (e.g. the service provider 210) connected to the plug-ins hub service. The plug-ins hub service may communicate with the service automation platform 230 over a secure channel.

In at least one embodiment of the present disclosure, when a service provider 210 is connected to the service automation platform 230, the service provider 210 registers with the plug-ins hub service and provides information defining an interface of the service automation platform 230. Thus, the business relationship between the service provider 210 and the plug-ins hub service is established. The plug-ins hub service identifies a source of requests based on the data received from the service provider 210. The information contained in the plug-ins hub service database reflects the specific interface of the service automation platform 230. In at least one embodiment of the present disclosure, the specification information is supplied to the plug-ins hub service by the service provider 210.

In at least one embodiment of the present disclosure, the service automation platform 230 comprises a virtual IDP 250. Each virtual IDP 250 is associated with a service provider 210 such that access to the service provider 210 may be managed via credentials available via virtual IDP 250. The virtual IDP 250 also maintains authentication and encryption certificates for the service provider 210. The virtualized IDP 250 is further configured to allow credential exchanges based on contract terms between the service provider 210 and the virtual IDP 250. It will be appreciated that any trusting relationships between service provider 210 and virtual IDP 250 are enabled using digital certificates and private keys stored within virtual IDP 250.

The virtual IDP 250 further comprises virtualized public IDP 255 and a virtualized managed IDP 260. It will be appreciated that each of the virtualized public IDP 255 and virtualized managed IDP 260 include credentials such as for example, for tenant 220, user 280, and the like, as well as settings pertinent to the access of service provider 210. The virtual IDP 250 is configured to retrieve necessary user data and credentials from virtualized identity provider (i.e. virtualized managed IDP 260, virtualized public IDP 255, or virtualized exclusive IDP 270), which are allocated in different parts of the system 200.

In at least one embodiment of the present disclosure, the virtualized managed IDP 260, is used when a contract is made between the service automation platform 230 and the service provider 210, and is shared for tenant 220. The virtualized managed IDP 260 resides on the service automation platform 230. The virtualized managed IDP 260 is created when the tenant 220 purchases a subscription, and based on instructions provided by the provider plug-in 275.

In at least one embodiment of the present disclosure, a virtualized public IDP 255 is a single dedicated virtualized identity provider for each service provider 210 with data provided from a plurality of tenants (e.g. tenant 220). For example, each of the plurality of tenants may reuse a contract between the service provider 210 and the service automation platform 230.

In at least one embodiment of the present disclosure, a virtualized exclusive IDP 270 is created by the service provider plug-in 275, such that the virtualized exclusive IDP is only associated with a particular tenant 220 and that any other tenants will not have access to the virtualized exclusive IDP 270. It will be appreciated that this segregation ensures that credentials on virtualized exclusive IDP 270 are not compromised or divulged to other parties. In at least one embodiment of the present disclosure, user attributes (UAs) are specified user parameters such as, for example, username, mail, address, subscription ID, and tenant ID. User Attributes are stored in the service provider plug-in 275's user data storage 295. Some attributes are defined by tenant 220 and some are generated by service provider 210 during subscription provisioning, such as, for example, subscription ID, tenant ID and user ID.

In at least one embodiment of the present disclosure, a user attribute schema (UAS) represents rules of attribute packaging. UAS are stored in the service provider plug-in 275's user data storage 295. The UAS defines what data needs to be provided by the tenant 220 about his users (e.g. user 280) in order to facilitate access to service provider 210. In addition, the UAS determines what data needs to be generated during the provisioning process. The UAS determines a set of UAs, such as, for example, username, mail, address, subscription ID, tenant ID, Zip-code. In at least one embodiment of the present disclosure, the UAS are different for each service and can be configured by the service provider 210 according to their preferences (e.g., depending on the subscription price).

In at least one embodiment of the present disclosure, service provider settings include information on which type of virtualized IDP to use (e.g. virtualized public IDP 255, virtualized managed IDP 260, or virtualized exclusive IDP 270), and which type of SSO protocol to use (e.g. SAML, Open ID, Oauth etc.). It will be appreciated that the service provider settings are set by the service provider 210 and are stored in the service provider plug-in's user data storage 295. In at least one embodiment of the present disclosure, the service provider settings are generated during the process of provisioning. The service provider 210 is configured to generate service provider settings based on its preferences. For example, preferences include, the price of subscription, or the type of a product. (e.g. MICROSOFT® requires a separate identity provider for every Microsoft active directory domain).

In at least one embodiment of the present disclosure, the service automation platform 230 includes a user interface 240, and the service provider plug-ins 275 includes a user interface 240 configured to provide access and ease of use to the configurable aspects of the service automation platform 230 and the service provider plug-in 275, respectively.

In at least one embodiment of the present disclosure, the service provider plug-in 275 further comprises a service provisioning module 290. The service provisioning module 290 provides all changes in the subscription—i.e., changes in users' set, users' data, and changes in the subscription itself. The service provisioning module 290 provides the data from the service automation platform 230 to the service provider 210 using API calls. The service provisioning module 290 also returns data from the service provider 210 to the plug-in 275 (e.g., tenant ID in the service provider 210 system, subscription IDs, user IDs linked to the subscription, etc.).

In at least one embodiment of the present disclosure, the user data storage 295 is configured to store all the UAs, user data schemas and service provider settings. In at least one embodiment of the present disclosure, there is a virtualized user data storage 265 to access data of the user data storage 295. The virtualized user data storage 265 includes only needed user data for particular subscription in an appropriate for format suitable for the virtual IDP 250. The virtualized user data storage 265 further includes a service provider handler 360 and a handler implementation 350 (as further disclosed below). It will be appreciated that the service provider handler 360 and the handler implementation 350 allows for communication with the service automation platform 230 and in particular with the user interface 240. It will be appreciated that the main function of the virtualized user data storage 265 is to present user data in the format needed for the virtual IDP 250.

Figure 2A:
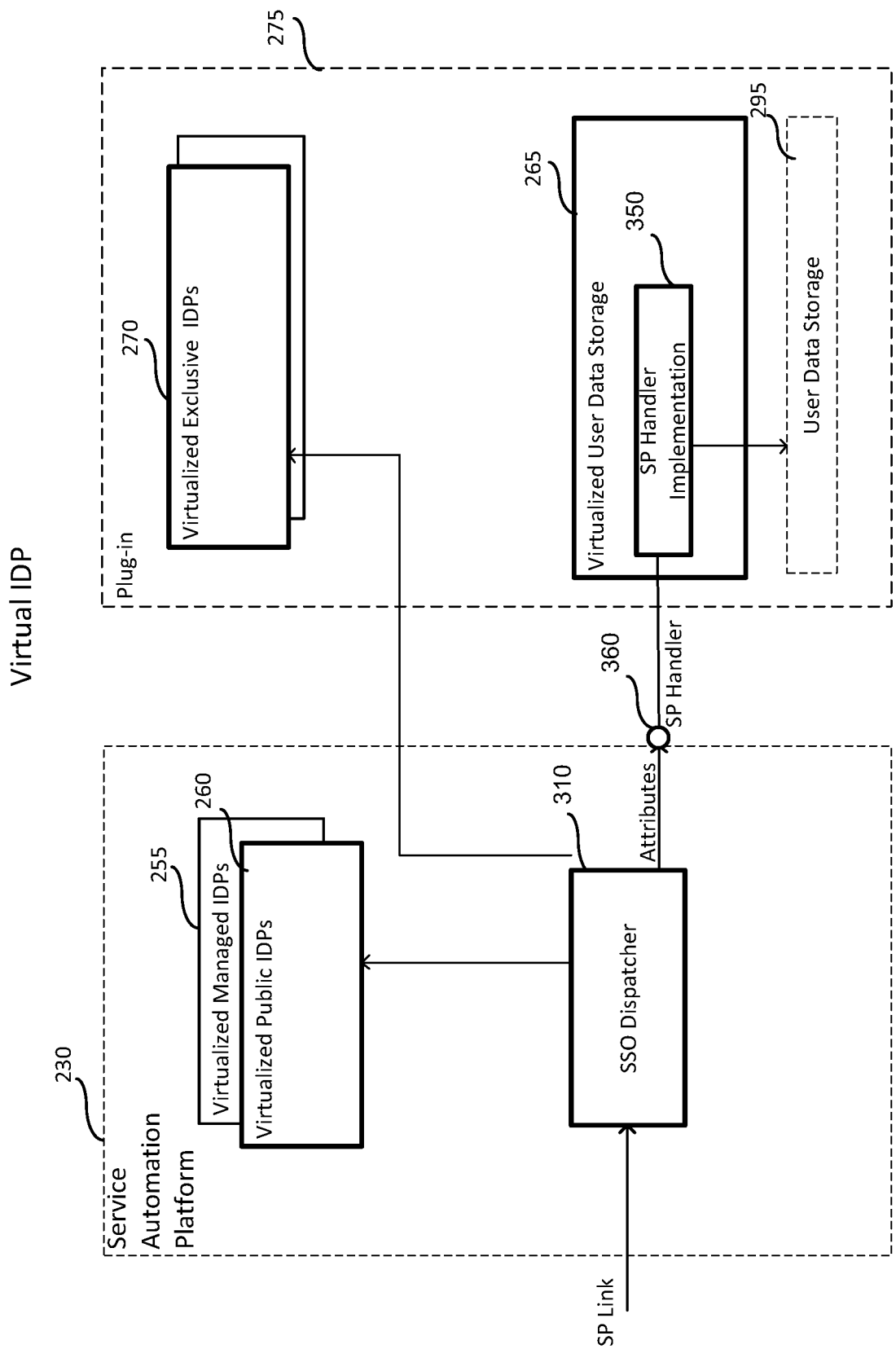
FIG. 2A is a schematic drawing of a system for multi-tenant SSO with dynamic attribute retrieval.

Referring now to FIG. 2A, there is shown a schematic drawing of service automation platform 230's components, in at least one embodiment of the present disclosure. The service automation platform 230 further includes an SSO dispatcher 310, a virtualized managed IDP 260, and a virtualized public IDP 255. The service provider plug-in 275 further includes a virtualized exclusive IDP 270, a virtualized user data storage 265, a service provider handler 360, and a handler implementation 350.

In at least one embodiment of the present disclosure, the virtualized exclusive IDP 270, the virtualized managed IDP 260, and the virtualized public IDP 255 include corresponding credentials and settings. It will be appreciated that such separation allows for the virtual IDP 250 to distribute data into different components of the service automation platform 230 and service provider plug-in 275, without storing actual credentials and settings.

In at least one embodiment of the present disclosure, a service provider handler 360 is an API of the virtualized user storage 265. The service provider Handler 360 is a part of the virtual IDP 250 and is activated after a request from the SSO dispatcher 310. The SSO dispatcher 310 is an agent of the virtual IDP 250 which is part of the service automation platform 230. The SSO dispatcher 310 may begin its operation after activation of the service link by a user 280. As soon as the service link is activated, the SSO dispatcher 310, using an ID provided by the service provider 210 in the user link, request the service provider handler 360 with a currently logged in user ID to return a response with UAs according with the attribute schema and service provider 210's settings for which component with the virtualized IDP 250 and SSO protocol to use.

In at least one embodiment of the present disclosure, the service provider handler implementation 350 provides dynamic attribute mapping by applying UAS to UAs. In addition the service provider handler implementation 350 is configured to receive instructions from corresponding service provider 210, including, which virtualized identity providers' credentials and SSO protocol to use for responses to the corresponding service provider 210. The service provider handler implementation 350 forms a response based on the service provider 210's ID and the user 280's ID. The SSO Dispatcher 310 treats them as separated entities.

In at least one embodiment of the present disclosure, the service provider handler 360 may return the information, such as, for example: 1) Which virtualized identity provider (i.e. virtualized managed IDP 260, virtualized public IDP 255, or virtualized exclusive IDP 270) to use to make a trusted request to the service provider SSO API 215; and, 2) the UAs associated with a user 280's ID packed with the corresponding UAS.

In at least one embodiment of the present disclosure, if a virtualized IDP is not assigned to the service provider 210, a default virtualized public IDP 255 is used. In at least one embodiment of the present disclosure, the service provider handler implementation 350 can include any instructions, such as, for example, what UAs and UAS to use depending on any rules. The rules and instructions are set by the creator/developer of the service provider plug-in 275 based on an appropriate contract with the service provider 210.

In at least one embodiment of the present disclosure, the SSO dispatcher 310 uses the service provider 210's settings and packages the attribute statement with needed credentials stored in the appropriate virtualized IDP (i.e. the virtualized public IDP 255, or the virtualized managed IDP 260, or the virtualized exclusive IDP 270), and sends an API call using the appropriate SSO protocol to the service provider 210 for completion of service provisioning procedure. In general, the SSO dispatcher 310 can use any virtualized IDP (i.e. the virtualized public IDP 255, or the virtualized managed IDP 260, or the virtualized exclusive IDP 270), based at least in party by the instructions returned by the service provider handler 360. It will be appreciated that the SSO dispatcher 310 may use the exclusive IDP 270's credentials generated in the service provider plug-in 275, a virtualized managed IDP 260's credentials generated inside the service automation platform 230, or a virtualized public IDP 255's credentials from within the service automation platform 330.

It will be further appreciated that the need to store User Attributes and User Attribute Schema is eliminated. The virtual IDP 250, advantageously, does not require any provision for a contract-specific attribute set. All technical problems and security problems are addressed within the service provider plug-in 275. Therefore, if some contract or technical items are changed, these changes are published as soon as they get to the user data storage 295 of the respective service provider plug-in 275. The service provider 210, using the service provider plug-in 275, can then revoke user access without additional provisioning and merely by returning a particular error code instead of the entire User Attributes.

It will be further appreciated that the system does not require the use of federation to keep User Attribute Schema and User Attributes on the service automation platform 230. Instead, the virtual IDP 250 request User Data that is located within the service provider plug-in 275. This is performed during every attempt by a user 280 to get access to the service provider 210.

Figure 2B:
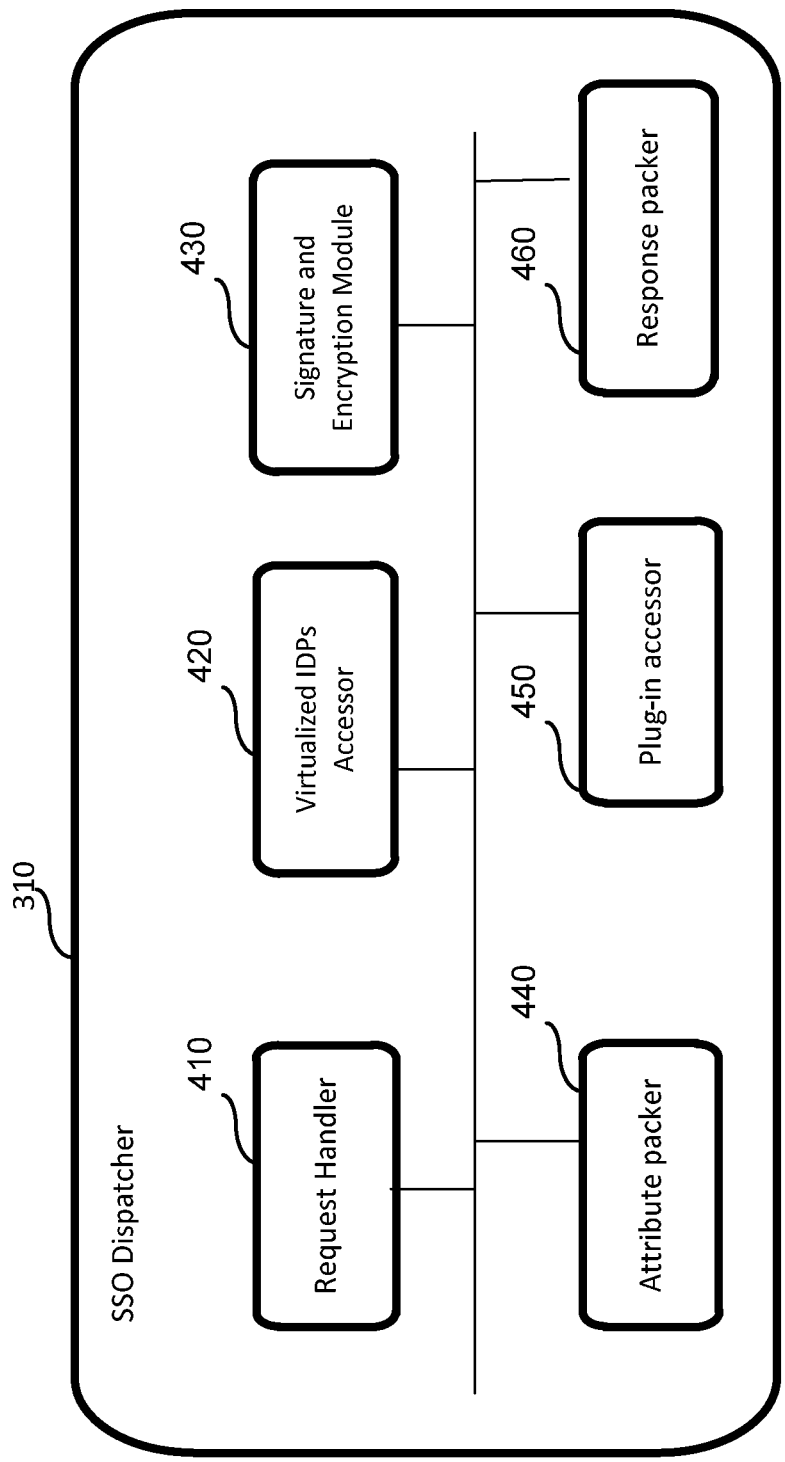
FIG. 2B is a schematic drawing of a system for multi-tenant SSO with dynamic attribute retrieval.

Referring now to FIG. 2B here is shown a schematic drawing of a SSO dispatcher 310's components. The SSO dispatcher 310 includes a request handler 410, a virtualized IDP accessor 420, a signature and encryption module 430, an attribute packer 440, a plug-in accessor 450, and a response packer 460.

In at least one embodiment of the present disclosure, the request handler 410 receives a link from service provider 210, and a specified ID for user 280 from the virtualized user data storage 265. The request handler 410, via the plug-in accessor 450, calls the service provider handler 360 and receives an attribute statement and the service provider 210's settings for the user 280. It will be appreciated that the user 280 is currently logged in to the service automation platform 330. Together with attribute statement and the service provider settings, the request handler 410 receives the user 280's ID from the appropriate virtualized IDP (i.e. the virtualized public IDP 255, or the virtualized managed IDP 260, or the virtualized exclusive IDP 270). In at least one embodiment of the present disclosure, the request handler 410, via the virtualized IDP accessor 420, checks to ensure it has access to service provider plug-in 275, and whether the user 280 and tenant 220 are permitted access to use the virtualized IDP 250 according to the service automation platform 230's settings. If the check is completed successfully the virtualized IDP accessor 420 gets credentials and virtual IDP 250's settings from the appropriate virtualized IDP (i.e. the virtualized public IDP 255, or the virtualized managed IDP 260, or the virtualized exclusive IDP 270). In at least one embodiment of the present disclosure, this data goes to the response packer 460. The response packer 460 generates authentication statement according to the SSO protocol specified in the service provider 210's settings. The response packer 460, using the attribute packer 440, takes the attribute statement and adds it to the authentication statement. After this the response packer 460 asks the signature and encryption module 430 to sign the response with mentioned credentials. In at least one embodiment of the present disclosure, the service provider 210's settings may require encryption, whereby the signature and encryption module 430 encrypts the response content. The response packer 460 may further add a signature to the response content. As a result the response packer 460 envelopes response and redirects user to URL from the Server Provider Settings.

Figure 3:
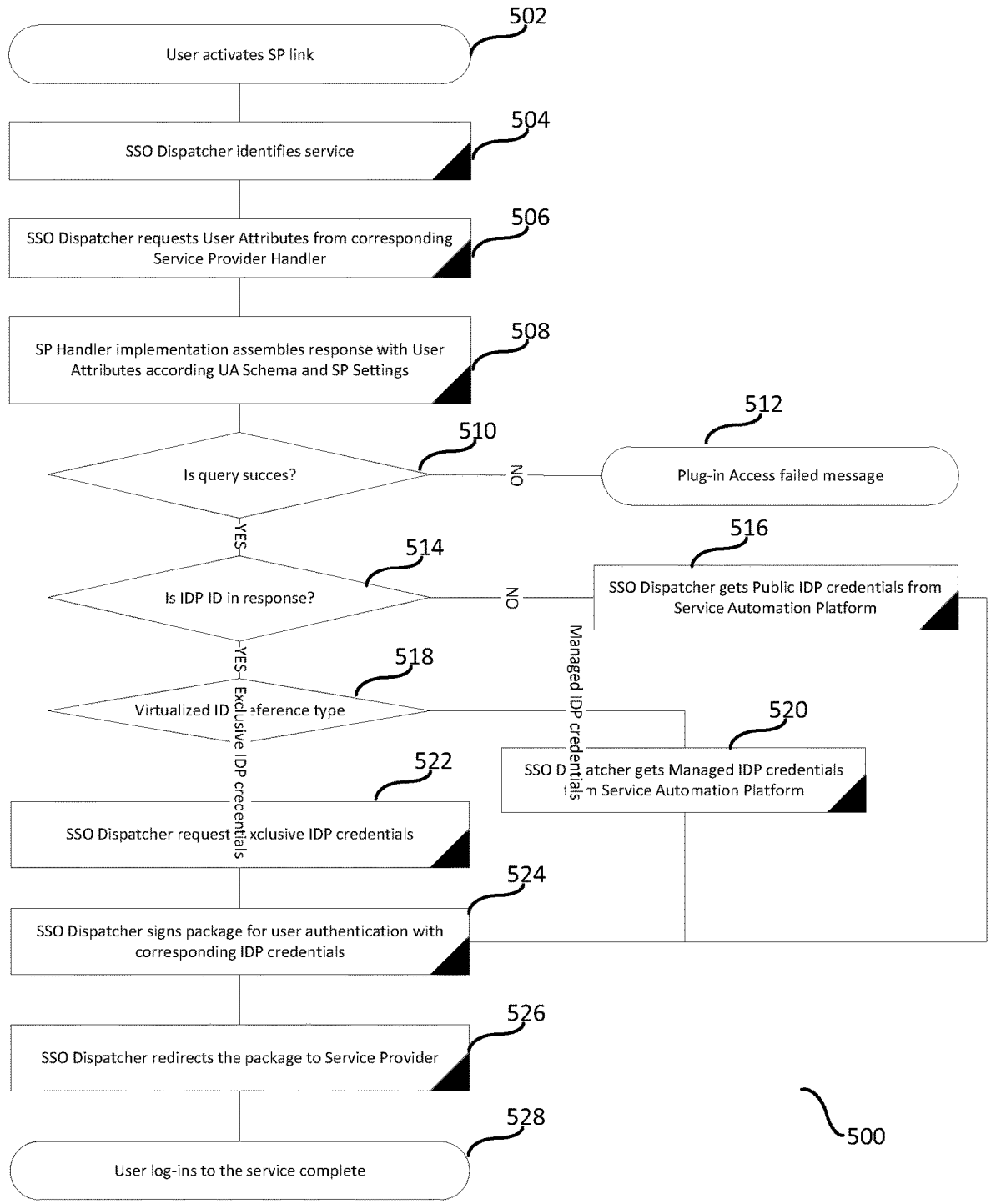
FIG. 3 is a flow-chart of a method for multi-tenant SSO with dynamic attribute retrieval.

Referring now to FIG. 3, there is shown a method for multi-tenant SSO with dynamic attribute retrieval, generally indicated at 500. The method 500 includes the steps of a user 280 activating a service provider link, at step 502; the SSO dispatcher 310 identifying a service provider 210 at step 504; the SSO dispatcher 310 requesting User Attributes from the corresponding service provider handler 360, at step 506; the service provider handler 360 assembling a response with User Attributes, at step 508; querying for success at step 510; checking if a virtualize IDP is identified, at step 514; checking if the virtualized IDP reference is identified, at step 518; the SSO dispatcher 310 requesting credentials to the virtualized exclusive IDP 270, at step 522; the SSO dispatcher 310 signing a package for authentication, at step 524; the SSO dispatcher 310 redirecting the package to the service provider 210, at step 526; and allowing the user 280 to login, at step 528.

In at least one embodiment of the present disclosure, a user 280 activates a link to a service provider 210, at step 502. For example, the user 280 may access a uniform resource locator (URL) specially configured for access to a service provider 210, and purchased for user 280, by tenant 220. In at least one embodiment of the present disclosure, the link may be accessible to the user 280 via the user interface 240. It will be appreciated that the link may include a plurality of services available to the user 280, via the service provider 210. It will be further appreciated that the user 280 may access the link via a browser, and use access credentials provided to the user 280.

In at least one embodiment of the present disclosure, SSO dispatcher 310 identifies the service provider 210, at step 504. For example, the SSO dispatcher 310 operates to identify at least one service provider 210, of a plurality of service providers that are available to the user 280.

In at least one embodiment of the present disclosure, the SSO dispatcher 310 requests the user attributes from the corresponding service provider handler 360, at step 506. For example, each service provider 210 (of a plurality of service providers), includes a service provider associated with the service provider handler 360. The SSO dispatcher 310 is configured to identify the service provider 210 embodied in the user 280's service provider link. Subsequently, the SSO dispatcher 310 is able to identify the corresponding service provider handler 360 associated with the previously identified service provider 210. The SSO dispatcher 310 further operates to request the user attributes, and the appropriate virtualized identity provider (i.e. virtualized managed IDP 260, virtualized public IDP 255, or virtualized exclusive IDP 270), from the service provider handler 360. It will be appreciated that the service provider handler 360 may query data from the user data storage 295, via the Service provider handler implementation 350.

In at least one embodiment of the present disclosure, the service provider handler implementation 360 assembles the response with the user attributes according to the user attributes Schema and service provider 210 settings, at step 508. In at least one embodiment of the present disclosure, all of the instructions for using the virtualized identity providers are already stored in the plug-in 275 and are written into it by the service provider 210.

At step 510, the SSO dispatcher 310 checks if the query in step 508 is a success. If successful, the method also checks if the identity provider is identified in the response, at step 514. If unsuccessful, a plug-in access failed message is conveyed, such as, for example, to the tenant 220 and user 280, via the user interface 240. At step 514, if the identity provider is identified in the response, the method proceeds to step 518 where the virtualized identity provider (i.e. virtualized managed IDP 260, virtualized public IDP 255, or virtualized exclusive IDP 270), is identified. At step 514, if the identity provider is not identified in the response, the SSO dispatcher 310 requests the credentials for the virtualized public IDP 255, from the service automation platform 230.

In at least one embodiment of the present disclosure, if the virtualized managed IDP 260 is identified, the SSO dispatcher 310 gets the virtualized managed IDP 260's credentials from the service automation platform 230, at step 520.

In at least one embodiment of the present disclosure, if the virtualized exclusive IDP 270 is identified, the SSO dispatcher 310 requests virtualized exclusive IDP 270's credentials from the service provider plug-in 275, at step 518.

In at least one embodiment of the present disclosure, the SSO dispatcher 310 signs package for user authentication with the corresponding IDP credentials, at step 524. It will be appreciated that the SSO dispatcher 310 may create its own signature.

In at least one embodiment of the present disclosure, the SSO dispatcher 310 redirects the package to the service provider 210, at step 526. The virtual IDP 250 sends the SSO token to the service provider 210 via service provider SSO API 215.

In at least one embodiment of the present disclosure, the user 280 is able to log in, at step 528. After receiving the appropriate SSO credentials, the user 280 is redirected to the service provider 210 based in part, on the validated credentials. This completes user 280's log-in process into the service provider 210.

Figure 4:
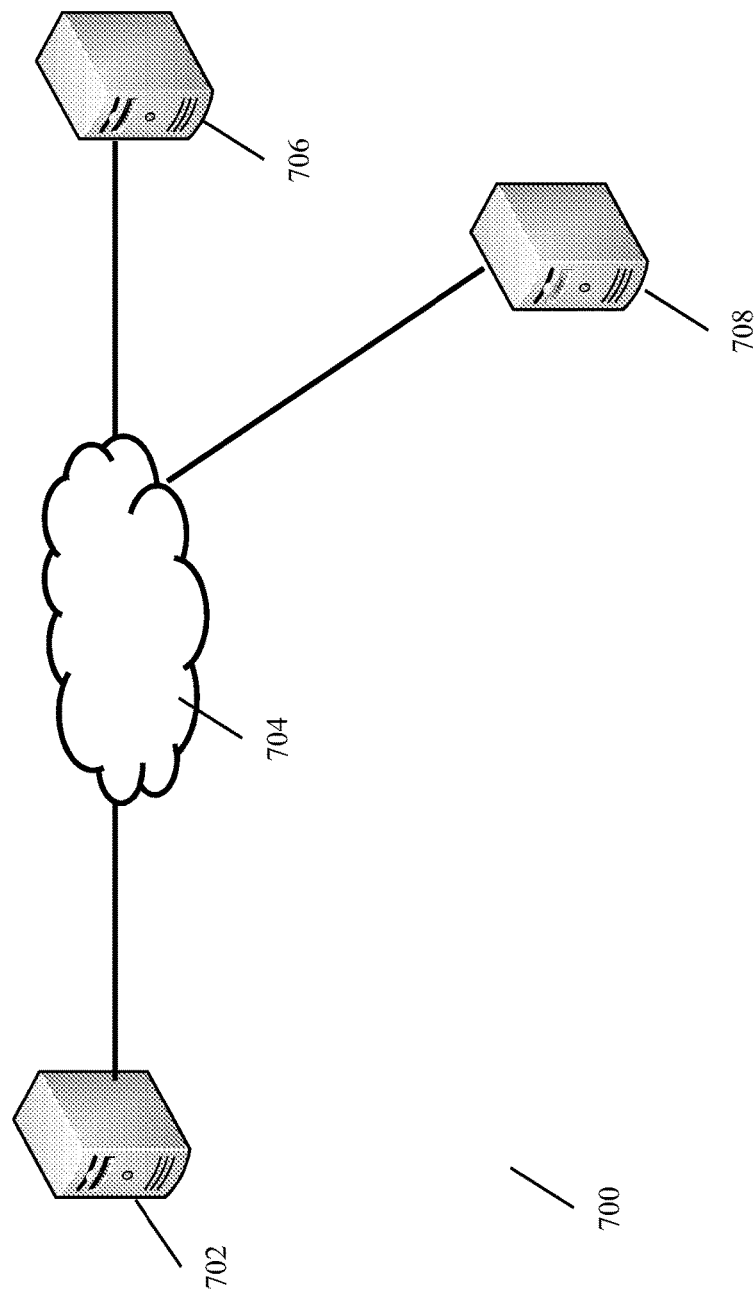
FIG. 4 is a schematic drawing of a system for multi-tenant SSO with dynamic attribute retrieval.

Referring now to FIG. 4, there is shown a schematic drawing of a system for multi-tenant SSO with dynamic attribute retrieval, indicated generally at 700. The system 700 includes a user device 702, a network 704, a service automation platform 706, and a vendor platform 708. It will be appreciated that each of the components of the system 700 may be configured to transmit information to and generally interact with each other via a web service and/or application programming interface infrastructure, over network 704. The user device 702 may include a web browser, mobile application, socket or tunnel, or other network connected software such that communication with the other components of the system 700 is possible over the network 704.

The user device 702, includes one or more computers, smartphones, tablets, wearable technology, computing devices, or systems of a type well known in the art, such as a mainframe computer, workstation, personal computer, laptop computer, hand-held computer, cellular telephone, MP3 player, or personal digital assistant. The user device 702 comprises such software, hardware, and componentry as would occur to one of skill in the art, such as, for example, one or more microprocessors, memory systems, input/output devices, device controllers, and the like. The user device 702 also comprises one or more data entry means (not shown in FIG. 4) operable by customers of the user device 702 for data entry, such as, for example, voice or audio control, a pointing device (such as a mouse), keyboard, touchscreen, microphone, voice recognition, and/or other data entry means known in the art. The user device 702 also comprises a display means which may comprise various types of known displays such as liquid crystal diode displays, light emitting diode display, and the like upon which information may be displayed in a manner perceptible to the customers. It will be appreciated that user device 702 may further comprise such software, hardware, and componentry as would occur to one of skill in the art, to operably perform the functions allocated to the user device 702 in accordance with the present disclosure.

The service automation platform 706 and vendor platform 708 are configured to store information generated by the system and/or retrieved from one or more information sources. In at least one embodiment of the present disclosure, the service automation platform 706 and vendor platform 708 may reside on a server or computing device remote from each other, provided that the service automation platform 706 and vendor platform 708, or computing device thereof are capable of bi-directional data transfer with each other, such as, for example, in Amazon AWS, Rackspace, or other virtual infrastructure, or any business network. In at least one embodiment of the present disclosure, the remote server or computing device upon which service automation platform 706 and vendor platform 708 may reside is electronically connected to the other components of system 700 via the network 704.

For purposes of clarity, each component of the system 700 is referred to herein as a single component. It will be appreciated by those of ordinary skill in the art that each component of the system 700 may comprise a plurality of components connected by software systems of a type well known in the art, which collectively are operable to perform the functions delegated to each component of the system 700 according to the present disclosure. The system 700 may also be part of distributed data architecture, such as, for example, a Hadoop architecture, for big data services. They system 700 may comprise relational database architecture, noSQL, OLAP, or other database architecture of a type known in the database art. The system 700 may comprise one of many well-known database management systems, such as, for example, MICROSOFT's SQL Server, MICROSOFT's ACCESS, MongoDB, Redis. Hadoop, or IBM's DB2 database management systems, or the database management systems available from ORACLE or SYBASE.

Having thus described an embodiment, it should be apparent to those skilled in the art that certain advantages of the described method and system have been achieved. It should also be appreciated that various modifications, adaptations, and alternative embodiments thereof may be made within the scope and spirit of the present disclosure. The disclosure is further defined by the following claims.

What is claimed is:

1. A method for multi-tenant SSO identity management with dynamic attribute retrieval, the method utilizing a system comprising at least one service provider, at least one service provider plug-in, and a service automation platform, the at least one service provider plug-in further comprising a service provider handler implementation, and the service automation platform further comprising a single sign-on (SSO) dispatcher, the method comprising the steps:
 a. activating, by a user, a link to a service provided by the at least one service provider;
 b. receiving at an SSO dispatcher, the link activated by the user;
 c. identifying by the SSO dispatcher the service provided by the at least one service provider;
 d. requesting at the SSO dispatcher, user attributes for the at least one service provider from a service provider handler;
 e. assembling at a service provider handler implementation, a response query with the user attributes, the user attributes assembled according to a user attributes schema and service provider settings;
 f. checking at the SSO dispatcher, whether the response query is a success, and if successful, proceeding to the next step, and if unsuccessful, displaying a message;
 g. checking at the SSO dispatcher, whether the response query includes identification of an identity provider, and if the response query does not include identification of an identity provider, retrieving public identity provider credentials from the service automation platform, and if the response query is successful, proceeding to the next step;
 h. determining at the SSO dispatcher, whether the response query identifies a managed identity provider, or an exclusive identity provider, and requesting the respective identity provider's credentials identified herein;
 i. signing at the SSO dispatcher, a package for a user's authentication with the credentials;
 j. redirecting at the SSO dispatcher, the package to the service provider.

2. The method of claim 1, wherein the user attributes is selected from a group consisting of a username, email address, address, subscription id, tenant id, and zip-code.

3. The method of claim 1, wherein the service provider settings are set by the service provider and stored in a user data storage.

4. The method of claim 1, wherein the service provider settings comprises information about a virtualized identity provider selected from a group consisting of a virtualized public identity provider, virtualized managed identity provider, or virtualized exclusive identity provider.

5. The method of claim 3, wherein the service provider settings further comprises of information about an SSO protocol.

6. The method of claim 1 further comprising the step allowing a user to log in to the service provider, using the package.

* * * * *